US012679060B2

(12) United States Patent (10) Patent No.: US 12,679,060 B2
Harada (45) Date of Patent: Jul. 14, 2026

(54) PRESS MACHINE AND METHOD OF MONITORING IMAGE OF PRESS MACHINE

(71) Applicant: AIDA ENGINEERING, LTD., Kanagawa (JP)

(72) Inventor: Yasuhiro Harada, Sagamihara (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 315 days.

(21) Appl. No.: 18/343,017

(22) Filed: Jun. 28, 2023

(65) Prior Publication Data

US 2024/0066825 A1 Feb. 29, 2024

(30) Foreign Application Priority Data

Aug. 25, 2022 (JP) ................................. 2022-134088

(51) Int. Cl.
B30B 15/14 (2006.01)
G06V 10/25 (2022.01)
(Continued)

(52) U.S. Cl.
CPC ............ B30B 15/148 (2013.01); G06V 10/25 (2022.01); G06V 10/761 (2022.01); G06V 20/52 (2022.01); *G06V 2201/06* (2022.01)

(58) Field of Classification Search
CPC ......... B30B 15/148; B30B 1/26; B30B 15/28; B30B 15/26; G06V 10/25; G06V 10/761; G06V 20/52; G06V 2201/06; G06V 10/74; G06T 7/001; G06T 2207/10016; G06T 2207/30164; G06T 2207/10024; G06T 2207/20081; G06N 20/00; H04N 7/18

See application file for complete search history.

(56) References Cited

U.S. PATENT DOCUMENTS 8,711,235 B2 * 4/2014 Chan .................. H04N 23/6812
348/208.5
10,031,014 B2 * 7/2018 Barbanti ................ G01B 11/00
(Continued)

FOREIGN PATENT DOCUMENTS

DE 10 2010 016646 B4 11/2021
JP H07-190884 A 7/1995
(Continued)

OTHER PUBLICATIONS

Office Action issued on Jun. 3, 2025 in the corresponding Japanese Patent Application No. 2022-134088, w/ English Translation.
(Continued)

*Primary Examiner* — Wesley J Tucker
(74) *Attorney, Agent, or Firm* — Rimon P.C.

(57) ABSTRACT

A press machine includes a storage unit configured to store moving image data captured by an imaging unit disposed at a position configured to allow the imaging unit to capture an image of a press die area, an image extraction unit configured to extract, from a group of still images forming the moving image data, a monitoring target image with reference to a position of a slide in the image or a state of a material to be processed, and an image monitoring unit configured to perform image monitoring based on the monitoring target image and to output a monitoring result.

8 Claims, 5 Drawing Sheets

(51) Int. Cl.
    *G06V 10/74*        (2022.01)
    *G06V 20/52*        (2022.01)

(56)                References Cited

U.S. PATENT DOCUMENTS

| 11,623,237 | B2 * | 4/2023 | Miyazaki | B41J 29/393 |
| | | | | 427/256 |
| 12,330,253 | B2 * | 6/2025 | Akiyama | B23Q 17/20 |
| 2014/0002635 | A1 * | 1/2014 | Huang | G01B 11/24 |
| | | | | 348/135 |
| 2017/0352148 | A1 | 12/2017 | Watanabe et al. | |
| 2018/0257100 | A1 * | 9/2018 | Yoshitomi | B41J 11/46 |
| 2019/0291375 | A1 * | 9/2019 | Harada | B30B 1/266 |
| 2020/0338849 | A1 * | 10/2020 | Harada | B30B 15/14 |
| 2022/0176667 | A1 * | 6/2022 | Hagestedt | G06V 10/25 |
| 2022/0308540 | A1 * | 9/2022 | Harada | B30B 15/285 |
| 2022/0342391 | A1 * | 10/2022 | Harada | G09G 5/026 |

FOREIGN PATENT DOCUMENTS

| JP | 2021-41454 A | 3/2021 |
| JP | 2022-51155 A | 3/2022 |
| KR | 10-2006-0116969 A | 11/2006 |

OTHER PUBLICATIONS

Extended European search report issued in the corresponding European Application No. 23186110.5 dated Feb. 8, 2024.
Office Action received in corresponding European Patent Application No. 23186110.5, dated Mar. 17, 2026.

* cited by examiner

PRESS MACHINE AND METHOD OF MONITORING IMAGE OF PRESS MACHINE

CROSS-REFERENCE TO RELATED APPLICATION

Japanese Patent Application No. 2022-134088, filed on Aug. 25, 2022, is hereby incorporated by reference in their entirety.

BACKGROUND OF THE INVENTION

The present invention relates to a press machine and a method of monitoring an image of a press machine.

As an example of image monitoring by a press, JP-A-2022-51155 discloses an invention that generates a gaze image obtained by cutting out a gaze object from a captured image based on distance data generated by a distance measuring device, and outputs the gaze image to a device available to a user. Japanese JP-A-2021-41454 discloses an invention in which, in an injection molding machine, an image is taken at a timing when a mold is opened or a timing when a molded product is taken out, and the image is compared with a reference image.

In the invention described in JP-A-2022-51155, since there are many disturbances only by an imaging device, the distance measuring device is combined, and monitoring is not performed only by the captured image. In addition, the invention described in JP-A-2021-41454 also performs photographing based on information of a controller that executes mold opening of the injection molding machine, and does not perform monitoring only using a photographed image.

SUMMARY OF THE INVENTION

The present invention can provide a press machine and a method of monitoring an image of the press machine capable of performing image monitoring only using image data.

A press machine according to a first aspect of the present invention is a press machine configured to convert rotation of a motor into reciprocating linear motion of a slide and to press a material to be processed, the press machine including:

a storage unit configured to store moving image data captured by an imaging unit disposed at a position configured to allow the imaging unit to capture an image of a press die area;

an image extraction unit configured to extract, from a group of still images forming the moving image data, a monitoring target image with reference to a position of the slide in the image or a state of the material to be processed; and an image monitoring unit configured to perform image monitoring based on the monitoring target image and to output a monitoring result.

A method of monitoring an image according to a second aspect of the present invention is a method of monitoring an image of a press machine configured to convert rotation of a motor into reciprocating linear motion of a slide and to press a material to be processed, the method including:

a storage step of storing moving image data captured by an imaging unit disposed at a position configured to allow the imaging unit to capture an image of a press die area;

an image extraction step of extracting, from a group of still images forming the moving image data, a monitoring target image with reference to a position of the slide in the image or a state of the material to be processed; and an image monitoring step of performing image monitoring based on the monitoring target image and outputting a monitoring result.

Figure 1:
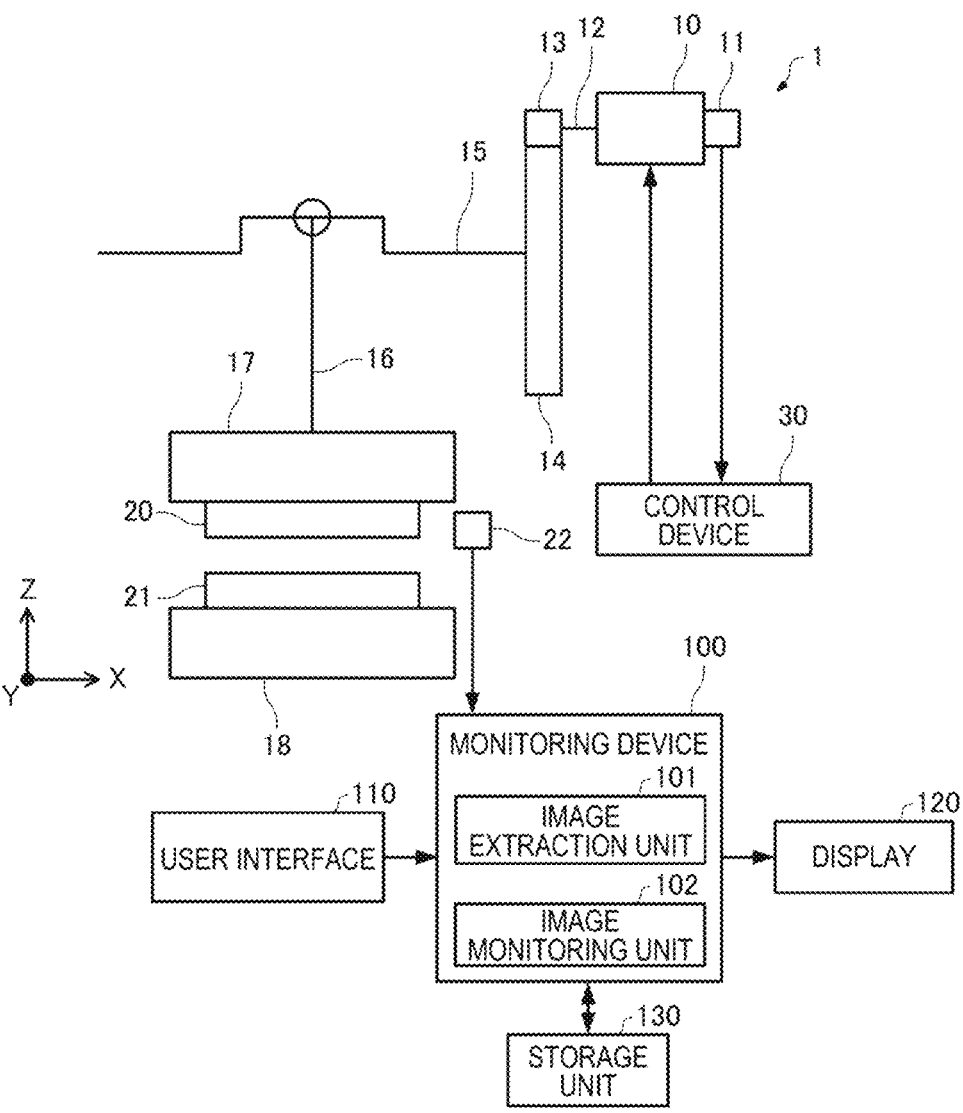
FIG. 1 is a diagram illustrating an example of a configuration of a press machine according to an embodiment of the present invention.

DETAILED DESCRIPTION OF THE INVENTION (1) A press machine according to an embodiment of the present invention is a press machine configured to convert rotation of a motor into reciprocating linear motion of a slide and to press a material to be processed, the press machine including:

a storage unit configured to store moving image data captured by an imaging unit disposed at a position configured to allow the imaging unit to capture an image of a press die area;

an image extraction unit configured to extract, from a group of still images forming the moving image data, a monitoring target image with reference to a position of the slide in the image or a state of the material to be processed; and an image monitoring unit configured to perform image monitoring based on the monitoring target image and to output a monitoring result.

Further, a method of monitoring an image of a press machine according to an embodiment of the present invention is a method of monitoring an image of a press machine configured to convert rotation of a motor into reciprocating linear motion of a slide and to press a material to be processed, the method including:

a storage step of storing moving image data captured by an imaging unit disposed at a position configured to allow the imaging unit to capture an image of a press die area;

an image extraction step of extracting, from a group of still images forming the moving image data, a monitoring target image with reference to a position of the slide in the image or a state of the material to be processed; and an image monitoring step of performing image monitoring based on the monitoring target image and outputting a monitoring result.

According to the above embodiment, since the monitoring target image is extracted from the group of still images forming the moving image data with reference to the position of the slide in the image and the state of the material to be processed, it is possible to perform image monitoring by extracting images at the same timing in each cycle during press production only with the image data (without using information of a controller).

(2) In the press machine according to the above embodiment, the image extraction unit may extract, from the group of still images, the still images having the same position of the slide as the monitoring target image.

In the method of monitoring the image of the press machine according to the above embodiment, in the image extraction step, the still images having the same position of the slide may be extracted as the monitoring target image from the group of still images.

(3) In the press machine according to the above embodiment, the image extraction unit may extract, from the group of still images, the still image at the timing when the material to be processed is stationary as the monitoring target image.

In the method of monitoring the image of the press machine according to the above embodiment, in the image extracting step, the still image at the timing when the material to be processed is stationary may be extracted as the monitoring target image from the group of still images.

(4) In the press machine according to the above embodiment, the image monitoring unit may set a monitoring target area corresponding to an area in which the material to be processed is processed in the monitoring target image, and may perform the image monitoring on the monitoring target area.

In the method of monitoring the image of the press machine according to the above embodiment, in the image monitoring step, a monitoring target area corresponding to an area in which the material to be processed is processed in the monitoring target image may be set, and the image monitoring may be performed on the monitoring target area.

According to the above embodiment, by performing the image monitoring on a partial area (monitoring target area) of the monitoring target image, it is possible to reduce a processing load related to the image monitoring.

(5) In the press machine according to the embodiment, the image monitoring unit may set the monitoring target area by comparing the monitoring target image extracted from the group of still images of the moving image data captured in a state where the material to be processed is present with the monitoring target image extracted from the group of still images of the moving image data captured in a state where the material to be processed is not present.

In the method of monitoring the image of the press machine according to the above embodiment, in the image monitoring step, the monitoring target area may be set by comparing the monitoring target image extracted from the group of still images of the moving image data captured in a state where the material to be processed is present with the monitoring target image extracted from the group of still images of the moving image data captured in a state where the material to be processed is not present.

According to the above embodiment, it is possible to automatically set the monitoring target area, which is an area in which the material to be processed is processed.

(6) In the press machine according to the embodiment, the image monitoring unit may output, by using a learning model generated by performing machine learning on the monitoring target image acquired in advance at the time of normal operation, a degree of similarity, as the monitoring result, between the monitoring target image acquired at the time of monitoring and the monitoring target image on which the machine learning is performed to generate the learning model.

In the method of monitoring the image of the press machine according to the above embodiment, in the image monitoring step, by using a learning model generated by performing machine learning on the monitoring target image acquired in advance at the time of normal operation, a degree of similarity between the monitoring target image acquired at the time of monitoring and the monitoring target image on which the machine learning is performed to generate the learning model may be output as the monitoring result.

(7) In the press machine according to the embodiment, the image monitoring unit may output, by using each learning model generated by performing machine learning on each of the still images of frames before and after the monitoring target image acquired in advance at the time of normal operation, a degree of similarity, as the monitoring result, between each of the still images of the frames before and after the monitoring target image, the still images being acquired at the time of monitoring, and each of the still images on which the machine learning is performed to generate each learning model.

In the method of monitoring the image of the press machine according to the above embodiment, in the image monitoring step, by using each learning model generated by performing machine learning on each of the still images of frames before and after the monitoring target image acquired in advance at the time of normal operation, a degree of similarity between each of the still images of the frames before and after the monitoring target image, the still images being acquired at the time of monitoring, and each of the still images on which the machine learning is performed to generate each learning model may be output as the monitoring result.

Hereinafter, embodiments of the present invention will be described in detail with reference to the drawings.

FIG. 1 is a diagram illustrating an example of a configuration of a press machine (servo press machine) according to the present embodiment. A press machine 1 converts rotation of a servomotor 10 into a vertical reciprocating motion (reciprocating linear motion, lifting motion) of a slide 17 by an eccentric mechanism that converts a rotational motion into a linear motion, and performs pressing on a material to be processed using the vertical reciprocating motion of the slide 17. The press machine 1 includes the servomotor 10, an encoder 11, a drive shaft 12, a drive gear 13, a main gear 14, a crankshaft 15, a connecting rod 16, the slide 17, a bolster 18, an imaging unit 22, a control device 30, a monitoring device 100, a user interface 110 (operation unit), a display 120 (display unit), and a storage unit 130. The press machine is not limited to a servo press machine, and may be, for example, a mechanical press using a flywheel or a linear motion type press using a ball screw. In this case, the encoder may be provided at the axial end of the crankshaft 15 or the axial end of the ball screw.

The drive shaft 12 is connected to a rotation shaft of the servomotor 10, and the drive gear 13 is connected to the drive shaft 12. The main gear 14 is meshed with the drive gear 13, the crankshaft 15 is connected to the main gear 14, and the connecting rod 16 is connected to the crankshaft 15. Rotation shafts such as the drive shaft 12 and the crankshaft 15 are supported by bearings (not illustrated) appropriately provided. The crankshaft 15 and the connecting rod 16 form the eccentric mechanism. This eccentric mechanism allows the slide 17 connected to the connecting rod 16 to move upwards and downwards relative to the stationary bolster 18. One or more upper molds 20 are attached to the slide 17, and one or more lower molds 21 are attached to the bolster 18.

The imaging unit 22 is a digital camera that is capable of capturing a moving image and includes an optical lens, a CCD/CMOS image sensor, and the like, and is disposed at a position configured to allow the imaging unit 22 to capture an image of a press die area. The press die area is an area where the upper mold 20 and the lower mold 21 provided between the slide 17 and the bolster 18 are mounted, and the moving image photographing target includes the slide 17, the bolster 18, the upper mold 20, the lower mold 21, a material to be processed, a conveyance device, a processing area, and the like. The moving image captured by the imaging unit 22 is output to the monitoring device 100 and stored in the storage unit 130 as moving image data.

The control device 30 controls the lifting motion of the slide 17 based on a predetermined slide motion stored in the storage unit. As an example, the control device 30 includes a control device such as a PLC, a servo controller, and a servo amplifier. More specifically, the control device 30 calculates a motor rotational position command value from a command of the position and speed of the slide 17 defined by the slide motion, and controls the rotational position, rotational speed, and current of the servomotor 10 based on a rotational position command. The rotational position of the servomotor 10 is detected by the encoder 11 attached to the servomotor 10.

In addition, the control device 30 controls the operation of the conveyance device (not illustrated) that conveys a material to be processed to the next step. The conveyance device is, for example, a transfer feeder, and includes a pair of transfer bars (not illustrated) driven by a servomotor (not illustrated). The transfer bar is provided with fingers (not illustrated) for clamping the material to be processed. The transfer bar performs, by the servomotor, various operations such as a clamp operation (an operation of movement in the Y-axis direction to attach the finger to the material to be processed), a lift operation (an upward operation in the Z-axis direction), an advance operation (a forward movement operation in the X-axis direction), a downward operation (a downward operation in the Z-axis direction), an unclamp operation (an operation of movement in the Y-axis direction to detach the finger from the material to be processed), and a return operation (a rearward movement operation in the X-axis direction). The transfer bar may operate while partially overlapping each of the clamp operation and the lift operation, the lift operation and the advance operation, the advance operation and the downward operation, the downward operation and the unclamp operation, the unclamp operation and the return operation, and the return operation and the clamp operation. The conveyance device may be a roll feeder (feeding device) that feeds a sheet-like material to be processed to the next step. The control device 30 controls the operation of the slide 17 based on a press individual phase signal synchronized with a master phase signal, and controls the operation of the transfer feeder based on a transfer individual phase signal synchronized with the master phase signal. That is, the transfer feeder operates in synchronization with the operation of the slide 17.

An example of the monitoring device 100 is an industrial personal computer (IPC) including a processor, a control board including a microcomputer, an IC, or the like, and includes an image extraction unit 101 and an image monitoring unit 102. The Image extraction unit 101 extracts a monitoring target image from a group of still images (frame advance image) forming the moving image data stored in the storage unit 130 based on the position of the slide 17 in the image or the state of the material to be processed. The image extraction unit 101 may extract, from the group of still images, a still image having the same position of the slide 17 as the monitoring target image, or may extract, from the group of still images, a still image captured at a timing when the material to be processed is stationary as the monitoring target image.

The image monitoring unit 102 performs image monitoring based on the monitoring target image and outputs a monitoring result (such as an image representing the monitoring result) to the display 120. For example, using a learning model generated by performing machine learning on the monitoring target image extracted from the group of still images forming the moving image data acquired (imaged) in advance at the time of the normal operation, the image monitoring unit 102 outputs, as the monitoring result, a degree of similarity between the monitoring target image extracted from the group of still images forming the moving image data acquired at the time of monitoring and the monitoring target image on which machine learning is performed to generate the learning model (at the time of normal operation). In addition, the image monitoring unit 102 may set a monitoring target area corresponding to an area in the monitoring target image where the material to be processed is processed, and perform image monitoring of the set monitoring target area.

Figure 2:
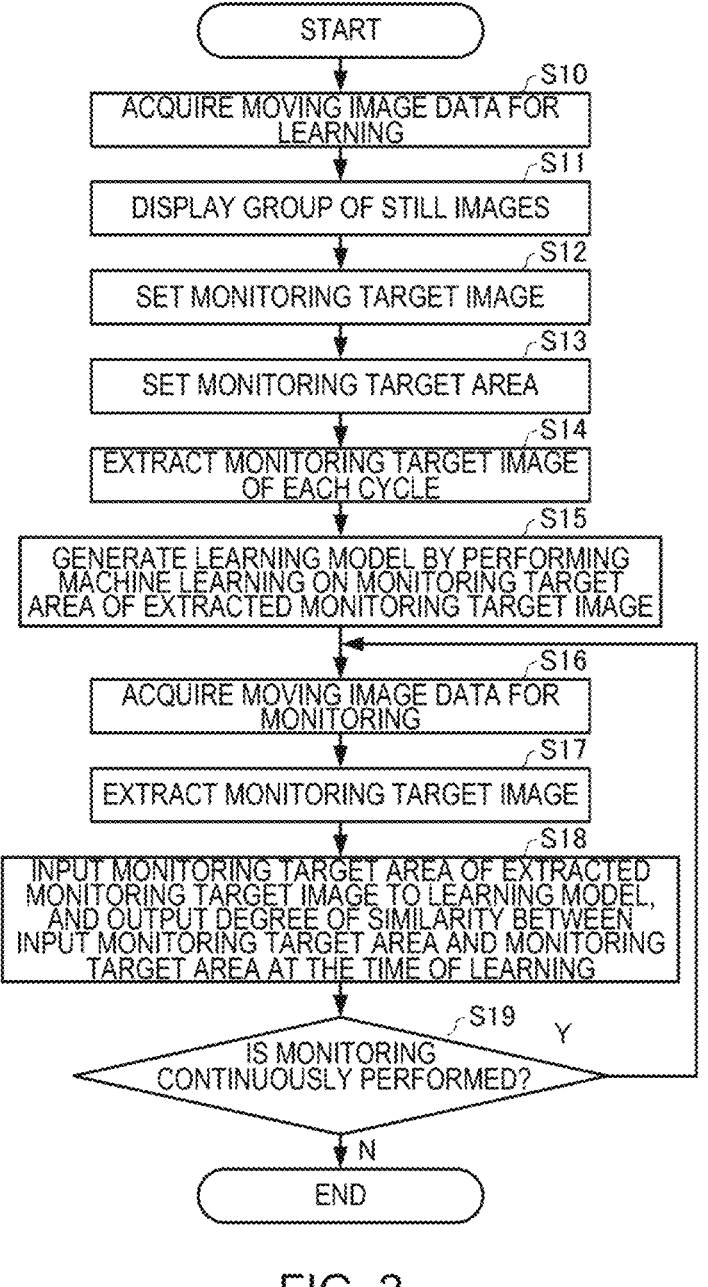
FIG. 2 is a flowchart illustrating a flow of processing of a monitoring device.

FIG. 2 is a flowchart illustrating a flow of processing of the monitoring device 100. After starting the production operation, the monitoring device 100 acquires moving image data (moving image data for learning) captured by the imaging unit 22 and stored in the storage unit 130 (step S10). Next, the monitoring device 100 displays a part of a group of still images forming the acquired moving image data on the display 120 (step S11). Here, a group of still images for at least one cycle is displayed. The group of still images for one cycle is a group of still images captured during one rotation of the crank (during one reciprocation of the slide).

Next, the monitoring device 100 receives an operation of selecting one still image from the group of still images displayed on the display 120 (an operation on the user interface 110 by the user), and sets the still image selected by the operation as a monitoring target image (step S12).

Figure 3:
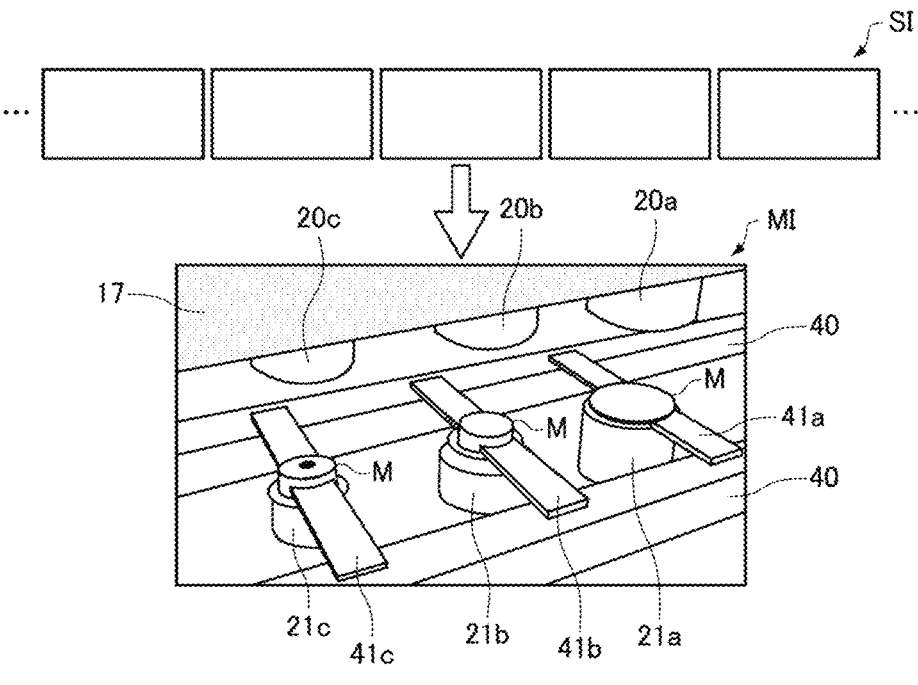
FIG. 3 is a diagram illustrating an example of a monitoring target image selected from a group of still images.

FIG. 3 illustrates an example of a monitoring target image MI selected from a group of still images SI. Here, an example is illustrated in which the imaging unit 22 is disposed at a position where three processing areas in the press die area can be imaged from obliquely above the rear side of the press. The monitoring target image MI includes the slide 17, an upper mold 20a and a lower mold 21a in a first processing area, an upper mold 20b and a lower mold 21b in a second processing area, an upper mold 20c and a lower mold 21c in a third processing area, and a material M to be processed in each of the first to third processing areas. In addition, the monitoring target image MI includes a pair of transfer bars 40 forming a transfer feeder as a conveyance device and fingers 41a, 41b, and 41c provided on the transfer bars 40. The disk-shaped material M before processing is conveyed to the first processing area from the upstream side by the finger 41a, conveyed to the second processing area by the finger 41b after being processed by the upper mold 20a and the lower mold 21a, conveyed to the third processing area by the finger 41c after being processed by the upper mold 20b and the lower mold 21b, and conveyed to the downstream side by the finger (not illustrated) after being processed by the upper mold 20c and the lower mold 21c. In this example, a still image captured at a timing when the slide 17 is descending and the conveyance by the transfer feeder is completed (the downward operation is completed, the material M is placed on the lower mold, and the finger is separated from the material M by the unclamp operation) is selected as the monitoring target image MI from the group of still images SI.

Figure 4:
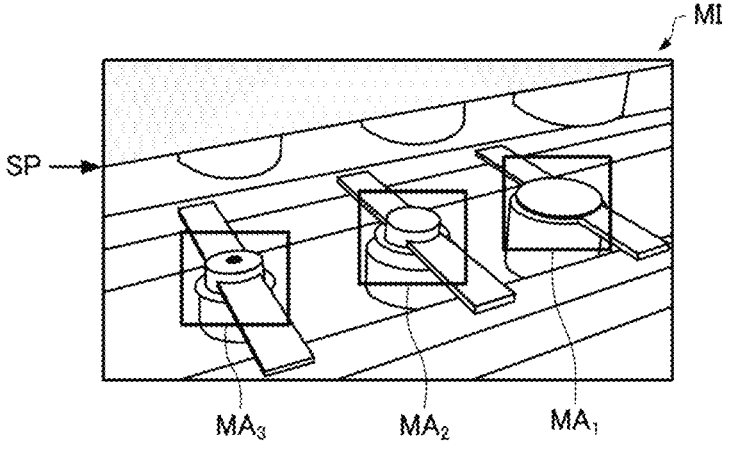
FIG. 4 is a diagram illustrating a setting example of a monitoring target area.

Next, the monitoring device 100 receives an operation of designating one or a plurality of monitoring target areas in the monitoring target image (an operation on the user interface 110 by the user), and sets the area designated by the operation as a monitoring target area (step S13). The user can freely and selectively designate the number of monitoring target areas and the positions and sizes of the respective monitoring target areas. In the example illustrated in FIG. 4, in the monitoring target image MI, the first processing area (the area including the material M on the lower mold 21a) is set as a monitoring target area MA₁, the second processing area (the area including the material M on the lower mold 21b) is set as a monitoring target area MA₂, and the third processing area (the area including the material M on the lower mold 21c) is set as a monitoring target area MA₃.

The monitoring device 100 detects a position of the slide 17 in the monitoring target image MI set in step S12 and stores the position in the storage unit 130. For example, the position (slide position SP) of the slide lower end at the left end of the monitoring target image MI is detected, and the coordinates are stored in the storage unit 130 as the slide position of the monitoring target image MI. Since the slide 17 is painted in a specific color, the slide position SP can be detected by detecting a boundary between the slide painting color and the background. In addition, the movement direction of the slide 17 is determined from the slide positions in the still images of the frames before and after the monitoring target image MI, and the determination result is stored in the storage unit 130 as the slide movement direction of the monitoring target image MI. When the slide position in the still image of the frame before the monitoring target image MI is located above the slide position SP in the monitoring target image MI and the slide position in the still image of the frame after the monitoring target image MI is located below the slide position SP in the monitoring target image MI, it can be determined that the slide movement direction is the downward direction (descending). When the slide position in the still image of the frame before the monitoring target image MI is located below the slide position SP in the monitoring target image MI and the slide position in the still image of the frame after the monitoring target image MI is located above the slide position SP in the monitoring target image MI, it can be determined that the slide movement direction is the upward direction (ascending). The slide position SP and the slide movement direction serve as references when the monitoring target image is extracted at the time of learning and monitoring.

In addition, the monitoring device 100 stores the coordinates of each monitoring target area set in step S13 in the storage unit 130. Here, the setting of the monitoring target area in the monitoring target image MI may be automatically performed without depending on the user's operation. For example, after setting the monitoring target image MI, a blanking operation in which a material to be processed is not conveyed is performed, a still image having the same slide position and slide movement direction as those of the monitoring target image MI is extracted from a group of still images forming moving image data captured at that time, and the extracted still image (monitoring target image extracted from a group of still images forming moving image data captured in a state where a material to be processed is not present) and the monitoring target image MI (monitoring target image extracted from a group of still images forming moving image data captured in a state where a material to be processed is present) are compared with each other. Since an area in which there is a difference (a degree of difference is equal to or greater than a predetermined threshold value, and a degree of similarity is equal to or less than a predetermined threshold value) between the extracted still image and the monitoring target image MI is an area (processing area) in which the material is placed, the area can be set as a monitoring target area.

Next, the image extraction unit 101 detects the slide position and the slide movement direction in each still image of the group of still images forming the moving image data for learning, and extracts, from the group of still images, a still image having the same slide position and slide movement direction as those of the monitoring target image MI set in step S12 as a monitoring target image for learning (step S14). In the example of the setting of the monitoring target image illustrated in FIG. 3, a still image of each cycle at a timing when the slide 17 is descending and conveyance by a transfer feeder is completed is extracted as the monitoring target image for learning.

Next, the monitoring device 100 performs machine learning on each monitoring target area in the monitoring target image extracted in step S14 to generate a learning model for each monitoring target area, and stores each learning model in the storage unit 130 (step S15). In the example of setting the monitoring target area illustrated in FIG. 4, machine learning is performed on the monitoring target area MA₁ in each extracted monitoring target image for learning to generate a first learning model, machine learning is performed on the monitoring target area MA₂ in each extracted monitoring target image to generate a second learning model, and machine learning is performed on the monitoring target area MA₃ in each extracted monitoring target image to generate a third learning model. As an algorithm of machine learning, an AI technology such as a neural network or deep learning can be used. This learning model is designed to output, for example, a value closer to 100 as an input image is the same as the monitoring target area of the monitoring target image for learning (degree of similarity is higher), and to output a value closer to 0 as an input image is different from the monitoring target image for learning (degree of similarity is lower).

Next, the monitoring device 100 sequentially acquires moving image data (moving image data for monitoring) captured by the imaging unit 22 and stored in the storage unit 130 (step S16). Then, the image extraction unit 101 detects the slide position and the slide movement direction in each still image of a group of still images forming the acquired moving image data, and extracts a still image having the same slide position and slide movement direction as those of the monitoring target image set in step S12 from the group of still images as the monitoring target image for monitoring (step S17). Since the transfer feeder operates in synchronization with the operation of the slide 17, the extracted monitoring target image should be the same image as the monitoring target image for learning if there is no problem in conveyance by the transfer feeder or the state of the material to be processed or the mold. In step S17, the number of times of extracting the monitoring image (cumulative number) is counted, and the number of times is stored as a production number in association with the extracted monitoring target image.

Next, the image monitoring unit 102 inputs each of the monitoring target areas in the monitoring target image extracted in step S17 to a learned learning model corresponding to each of the monitoring target areas, and outputs, to the display 120, a degree of similarity, as a monitoring result, between each of the input monitoring target areas and each of the monitoring target areas on which machine learning is performed to generate the learning model (step S18). In the example of setting the monitoring target area illustrated in FIG. 4, the monitoring target area $MA_1$ in the extracted monitoring target image for monitoring is input to the first learning model to output the degree of similarity between the input monitoring target area $MA_1$ and the monitoring target area $MA_1$ on which machine learning is performed to generate the first learning model, the monitoring target area $MA_2$ in the extracted monitoring target image is input to the second learning model to output the degree of similarity between the input monitoring target area $MA_2$ and the monitoring target area $MA_2$ on which machine learning is performed to generate the second learning model, and the monitoring target area $MA_3$ in the extracted monitoring target image is input to the third learning model to output the degree of similarity between the input monitoring target area $MA_3$ and the monitoring target area $MA_3$ on which machine learning is performed to generate the third learning model. The monitoring result of the extracted monitoring target image (degree of similarity of each monitoring target area) is output together with the production number associated with the monitoring target image.

Next, the monitoring device 100 determines whether to continuously perform monitoring (step S19), and if monitoring is to be continued (Y in step S19), the processing proceeds to step S16, and thereafter, extraction of the monitoring target image and output of the monitoring result in each cycle are repeatedly performed until monitoring is finished. Note that, in step S19, it is determined whether or not the accuracy of the monitoring result is sufficiently secured, and in a case where the determination is negative, the processing proceeds to step S1 so that the monitoring target image can be reset (reselected). For example, when the degree of similarity between each monitoring target area and each monitoring target area on which machine learning is performed to generate each learning model is equal to or less than a predetermined threshold value, it may be determined that accuracy of the monitoring result is not secured.

Figure 5:
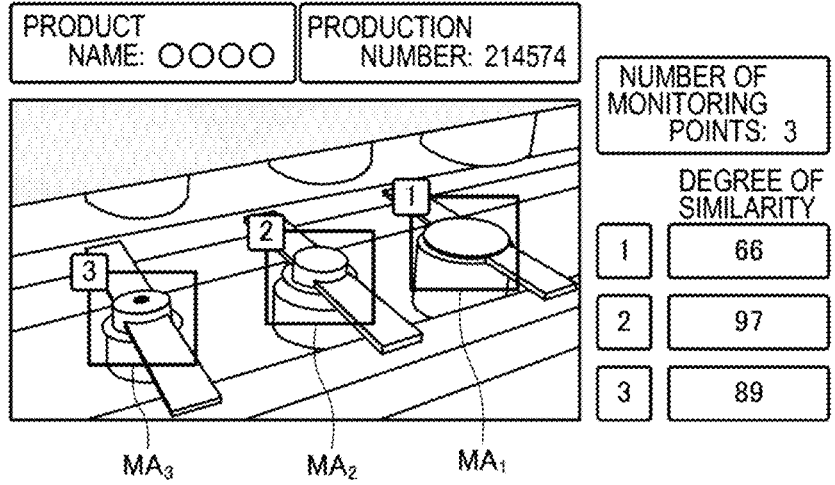
FIG. 5 is a diagram illustrating a display example of a monitoring result.

FIG. 5 illustrates a display example of a monitoring result. In the example illustrated in FIG. 5, the display 120 displays the product name, the production number (the number of times of extraction of the monitoring target image), and the setting status of the monitoring target area (monitoring point). Further, the display 120 displays, as a monitoring result, a degree of similarity between each of the monitoring target areas $MA_1$ to $MA_3$ and each of the monitoring target areas $MA_1$ to $MA_3$ on which machine learning is performed to generate each learning model. In this example, it is indicated that the degree of similarity between the monitoring target area $MA_1$ and the monitoring target area $MA_1$ on which machine learning is perform to generate the first learning model is low, and it is suggested that there is a problem in the first processing area (either the conveyance by the finger 41a, the state of the material to be processed on the lower mold 21a, or the state of the lower mold 21a). As illustrated in FIG. 5, instead of displaying the degree of similarity between each monitoring target area and each monitoring target area on which machine learning is perform to generate each learning model in real time, an average value (alternatively, the maximum value or the minimum value) of the degree of similarity for the latest predetermined number of cycles (the production number) may be displayed, or a graph representing a temporal change in the degree of similarity of each cycle from the start of monitoring to the present may be displayed.

According to the present embodiment, by extracting the monitoring target image with reference to the slide position (and slide movement direction) in the image from the group of still images forming the moving image data obtained by photographing the press die area, it is possible to extract the image at the same timing in each cycle during the production operation only with the image data (without using the information of the control device 30) and to perform the image monitoring (output the degree of similarity based on the monitoring target image for learning). As a result, it is possible to detect a misfeed of a material/product, and detect a crack/split of a material, a scratch/pin breakage of a mold, and the like. In addition, there are great advantages in that a sensor used for misfeed detection becomes unnecessary, conveyance stability is quantified as a degree of similarity to provide an opportunity of reviewing the finger adjustment and the feeding range, product confirmation work can be simplified, and the necessity of mold maintenance can be known without stopping press processing. In addition, since it is not necessary to input an angle signal of the press and a signal of the production number counter from the control device 30, the monitoring device 100 can be a device that is controllably independent of the control device 30, and it is easy to retrofit the existing press with the monitoring device 100. In addition, according to the present embodiment, by setting a partial area of a monitoring target image as a monitoring target area and performing learning and monitoring thereon, a processing load can be reduced as compared with a case in which learning and monitoring are performed on the entire monitoring target image.

In the above example, a description has been given as to a case in which, at the time of learning and monitoring, a still image having the same slide position is extracted as a monitoring target image from a group of still images forming moving image data with reference to the slide position. However, a still image at a timing when a material to be processed is stationary may be extracted as the monitoring target image from the group of still images forming the moving image data with reference to the state of the material to be processed in the image. The still image at the timing when the material to be processed is stationary is a still image captured at a timing when conveyance by a transfer feeder is completed (the downward operation is completed, the material is placed on the lower mold, and the finger is separated from the material M by the unclamp operation).

Figure 6:
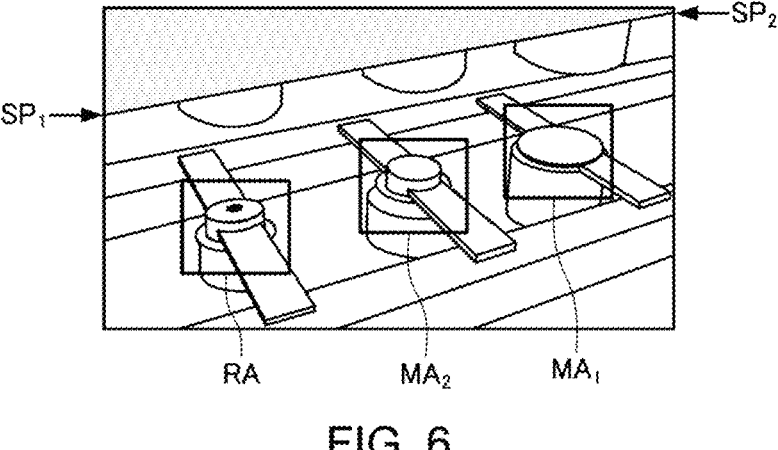
FIG. 6 is a diagram illustrating a setting example of a reference monitoring area.

In the example illustrated in FIG. 6, a user sets a first processing area in the still image as a monitoring target area $MA_1$, sets a second processing area as a monitoring target area $MA_2$, and sets a third processing area as a reference monitoring area RA. The reference monitoring area RA is an area serving as a reference when a monitoring target image is extracted. In this case, in the group of still images, a still image in which the reference monitoring area RA is the same image as the reference monitoring area RA in the still image of the next frame (a still image captured at the timing when a material conveyed to the third processing area remains stationary) is extracted as the monitoring target image. For example, when the reference monitoring area RA in the still image of the nth frame and the reference monitoring area RA in the still image of the (n+1)-th frame are different (degree of similarity is low) images, and the reference monitoring area RA in the still image of the (n+1)-th frame and the reference monitoring area RA in the still image of the (n+2)-th frame are the same (degree of similarity is high) image, the still image of the (n+1)-th frame is extracted as the monitoring target image. Then, at the time of learning, machine learning is performed on the monitoring target area $MA_1$ in each extracted monitoring target image for learning to generate a first learning model, machine learning is performed on the monitoring target area $MA_2$ in each extracted monitoring target image to generate a second learning model, and machine learning is performed on a slide position in each extracted monitoring target image (a position $SP_1$ of the lower end of the slide at the left end of the monitoring target image and a position $SP_2$ of the lower end of the slide at the right end or upper end of the monitoring target image) to generate a third learning model. In addition, at the time of monitoring, the monitoring target area $MA_1$ in each monitoring target image extracted for monitoring is input to the first learning model to output the degree of similarity between the input monitoring target area $MA_1$ and the monitoring target area $MA_1$ on which machine learning is performed to generate the first learning model, the monitoring target area $MA_2$ in each extracted monitoring target image is input to the second learning model to output the degree of similarity between the input monitoring target area $MA_2$ and the monitoring target area $MA_2$ on which machine learning is performed to generate the second learning model, and the slide positions $SP_1$ and $SP_2$ in each extracted monitoring target image are input to the third learning model to output the degrees of similarity between the input slide positions $SP_1$ and $SP_2$ and the slide positions $SP_1$ and $SP_2$ on which machine learning is performed to generate the third learning model.

Figure 7:
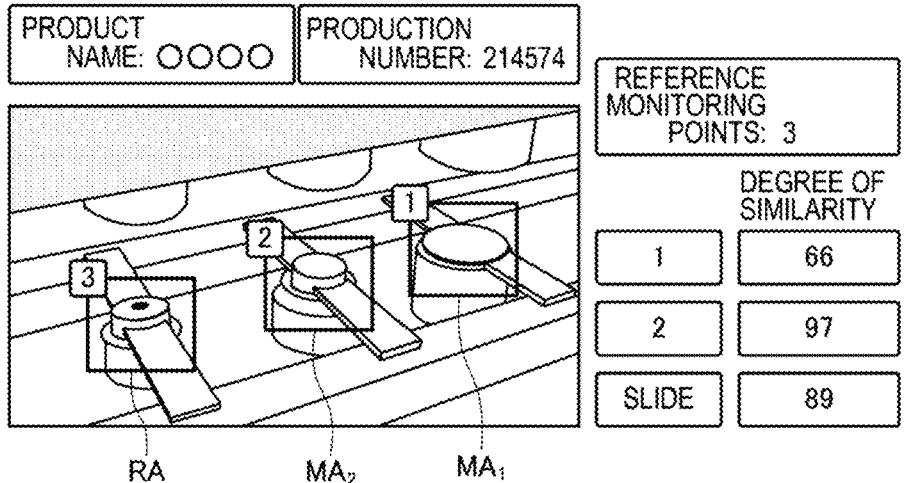
FIG. 7 is a diagram illustrating a display example of a monitoring result in a case where a monitoring target image is extracted with reference to a state of a material to be processed.

FIG. 7 illustrates a display example of a monitoring result in a case where the monitoring target image is extracted with reference to the state of the material to be processed. In the example illustrated in FIG. 7, the degree of similarity between each of the monitoring target areas $MA_1$ and $MA_2$ and each of the monitoring target areas $MA_1$ and $MA_2$ on which machine learning is performed to generate each learning model, and the degree of similarity between the slide position and the slide position on which machine learning is performed to generate a learning model are displayed as the monitoring result. In this example, since the degree of similarity of each of the monitoring target area $MA_2$ and the slide position is high and the degree of similarity of the monitoring target area $MA_1$ is low, it is inferred that there is a problem in the first processing area (either the conveyance by the finger 41*a*, the state of the material to be processed on the lower mold 21*a*, or the state of the lower mold 21*a*). If the degree of similarity of each of the slide position and the monitoring target area $MA_1$ is high and the degree of similarity of the monitoring target area $MA_2$ is low, it is inferred that there is a problem in the second processing area (either the conveyance by the finger 41*b*, the state of the material to be processed on the lower mold 21*b*, or the state of the lower mold 21*b*), and if the degree of similarity of each of the monitoring target areas $MA_1$ and $MA_2$ and the slide position is low, it is inferred that there is a problem in the third processing area (either the conveyance by the finger 41*c*, the state of the material to be processed on the lower mold 21*c*, or the state of the lower mold 21*c*).

Further, in the above example, the case where learning and image monitoring are performed using only the monitoring target image extracted from the group of still images has been described. However, in addition to the monitoring target image extracted from the group of still images, learning and image monitoring may be performed using still images of n (n is a natural number) frames before and after the monitoring target image. For example, in a case where monitoring target areas $MA_1$, $MA_2$, and $MA_3$ are set, learning models $LM_1$, $LM_2$, and $LM_3$ are generated by performing machine learning on the monitoring target areas $MA_1$, $MA_2$, and $MA_3$ in the monitoring target image extracted for learning, learning models $LM_{1p}$, $LM_{2p}$, and $LM_{3p}$ are generated by performing machine learning on the monitoring target areas $MA_1$, $MA_2$, and $MA_3$ in the still image of the previous frame of the monitoring target image, and learning models $LM_{1n}$, $LM_{2n}$, and $LM_{3n}$ are generated by performing machine learning on the monitoring target areas $MA_1$, $MA_2$, and $MA_3$ in the still image of the subsequent frame of the monitoring target image. Then, the monitoring target areas $MA_1$, $MA_2$, and $MA_3$ in the monitoring target image extracted for monitoring are respectively input to the learning models $LM_1$, $LM_2$, and $LM_3$ to output the degree of similarity between each of the input monitoring target areas $MA_1$, $MA_2$, and $MA_3$ in the monitoring target image and the monitoring target areas $MA_1$, $MA_2$, and $MA_3$ on which machine learning is performed to generate each learning model, the monitoring target areas $MA_1$, $MA_2$, and $MA_3$ in the still image of the previous frame of the monitoring target image are respectively input to the learning models $LM_{1p}$, $LM_{2p}$, and $LM_{3p}$ to output the degree of similarity between each of the input monitoring target areas $MA_1$, $MA_2$, and $MA_3$ in the still image and each of the monitoring target areas $MA_1$, $MA_2$, and $MA_3$ on which machine learning is performed to generate each learning model, and the monitoring target areas $MA_1$, $MA_2$, and $MA_3$ in the still image of the subsequent frame of the monitoring target image are respectively input to the learning models $LM_{1n}$, $LM_{2n}$, and $LM_{3n}$ to output the degree of similarity between each of the input monitoring target areas $MA_1$, $MA_2$, and $MA_3$ in the still image and each of the monitoring target areas $MA_1$, $MA_2$, and $MA_3$ on which machine learning is performed to generate each learning model.

Figure 8:
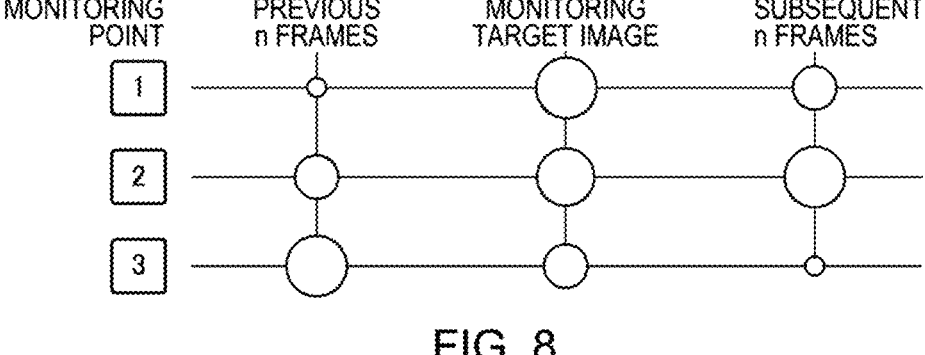
FIG. 8 is a diagram illustrating a display example of a monitoring result in a case where learning and monitoring are performed using still images of frames before and after a monitoring target image.

FIG. 8 is a bubble chart illustrating an example of a monitoring result in a case where learning and image monitoring are performed using still images of n frames before and after a monitoring target image. In the example of FIG. 8, a still image at the timing when a material to be processed remains stationary is extracted as a monitoring target image, and for each of the three monitoring target areas (monitoring points), a degree of similarity at the time of learning of the monitoring target image, an average value of degrees of similarity at the time of learning of the still images of n frames before the monitoring target image, and an average value of degrees of similarity at the time of learning of the still images of n frames after the monitoring target image are each indicated by a circle (a circle, the diameter of which increases as the degree of similarity becomes higher). In this example, since the degree of similarity of the images of the n frames before the monitoring target image is low for the monitoring target area "1", it is found that the placement of the material in the first processing area is bad (the material is placed while shaking, or the like), and it is inferred that the setting of an allocation angle is not good, such as a long overlap section between the advance operation and the downward operation of the transfer feeder or a long overlap section between the downward operation and the unclamp operation (an overlap amount is large). In addition, for the monitoring target area "3", since the degree of similarity of the images of n frames after the monitoring target image is low, it can be seen that the material is unstable after the material is placed in the third processing area, and problems such as poor structure and state of the lower mold 21c and the poor position and state of the finger 41c can be inferred. In this manner, by performing image monitoring using still images of frames before and after a monitoring target image (a still image at a timing when a material to be processed remains stationary), it is possible to provide a specific improvement measure for stabilizing conveyance. Not only a method of directly displaying the bubble chart to promote the estimation, but also a method of calculating the bubble chart using the image monitoring unit 102 and outputting a determination result such as "poor material placement" may be used.

In addition, the monitoring target image may be extracted from the moving image data obtained by capturing an image of the press die area in a state where the material is conveyed to monitor the image of the material, and the monitoring target image may be extracted from the moving image data obtained by capturing an image of the press die area in a state where the material is not conveyed to monitor the image of the mold. In addition, an imaging unit configured to capture an image of the upper mold from obliquely below may be further provided, and an image of the upper mold may be monitored by extracting a monitoring target image from the moving image data captured by the imaging unit.

Although embodiments of the present invention have been described in detail as described above, those skilled in the art can easily understand that many modifications can be made without departing from the novelties and effects of the present invention.

As described above, while embodiments of the present invention have been described in detail, it will be readily apparent to those skilled in the art that many modifications are possible without substantially departing from novelties and effects of the present invention. Therefore, all such modifications are included in the scope of the present invention.

What is claimed is:

1. A press machine configured to convert rotation of a motor into reciprocating linear motion of a slide and to press a material to be processed, the press machine comprising:

a storage configured to store moving image data captured by an imaging unit disposed at a position configured to allow the imaging unit to capture an image of a press die area; and a processor configured to:

extract, from a group of still images forming the moving image data, a still image as a monitoring target image, in which a position of the slide and a movement direction of the slide are the same as the position of the slide and the movement direction of the slide detected from the still image selected in advance by a user, the movement direction of the slide being determined from the positions of the slide in the still images of frames before and after the still image, or compare a reference monitoring area based on a state of the material to be processed selected in advance by the user or set automatically in a still image of the group of still images forming the moving image data with a reference monitoring area in a still image of a next frame and extract, as a monitoring target image, a matching still image; and perform image monitoring based on the monitoring target image and to output a monitoring result.

2. The press machine according to claim 1, wherein the processor extracts, from the group of still images, the still images having the same position of the slide, as the monitoring target image.

3. The press machine according to claim 1, wherein the processor extracts, from the group of still images, the still image at a timing when the material to be processed is stationary as the monitoring target image.

4. The press machine according to claim 1, wherein the processor sets a monitoring target area corresponding to an area in which the material to be processed is processed in the monitoring target image, and performs the image monitoring on the monitoring target area.

5. The press machine according to claim 4, wherein the processor sets the monitoring target area by comparing the monitoring target image extracted from the group of still images of the moving image data captured in a state where the material to be processed is present with the monitoring target image extracted from the group of still images of the moving image data captured in a state where the material to be processed is not present.

6. The press machine according to claim 1, wherein the processor outputs, by using a learning model generated by performing machine learning on the monitoring target image acquired in advance at the time of normal operation, a degree of similarity, as the monitoring result, between the monitoring target image acquired at the time of monitoring and the monitoring target image on which the machine learning is performed to generate the learning model.

7. The press machine according to claim 1, wherein the processor outputs, by using each learning model generated by performing machine learning on each of the still images of frames before and after the monitoring target image acquired in advance at the time of normal operation, a degree of similarity, as the monitoring result, between each of the still images of the frames before and after the monitoring target image, the still images being acquired at the time of monitoring, and each of the still images on which the machine learning is performed to generate each learning model.

8. A method of monitoring an image of a press machine configured to convert rotation of a motor into reciprocating linear motion of a slide and to press a material to be processed, the method comprising:

a storage step of storing moving image data captured by an imaging unit disposed at a position configured to allow the imaging unit to capture an image of a press die area;

an image extraction step of:

extracting, from a group of still images forming the moving image data, a still image as a monitoring target image, in which a position of the slide and a movement direction of the slide are the same as the position of the slide and the movement direction of the slide detected from the still image selected in advance by a user, the movement direction of the slide being determined from the positions of the slide in the still images of frames before and after the still image, or comparing a reference monitoring area based on a state of the material to be processed selected in advance by the user or set automatically in a still image of the group of still images forming the moving image data with a reference monitoring area in a still image of a next frame and extract, as a monitoring target image, a matching still image; and an image monitoring step of performing image monitoring based on the monitoring target image and outputting a monitoring result.

\* \* \* \* \*